July 20, 1948.  J. L. HEMP  2,445,325
INSULATED CONTAINER CLOSURE
Filed March 19, 1945
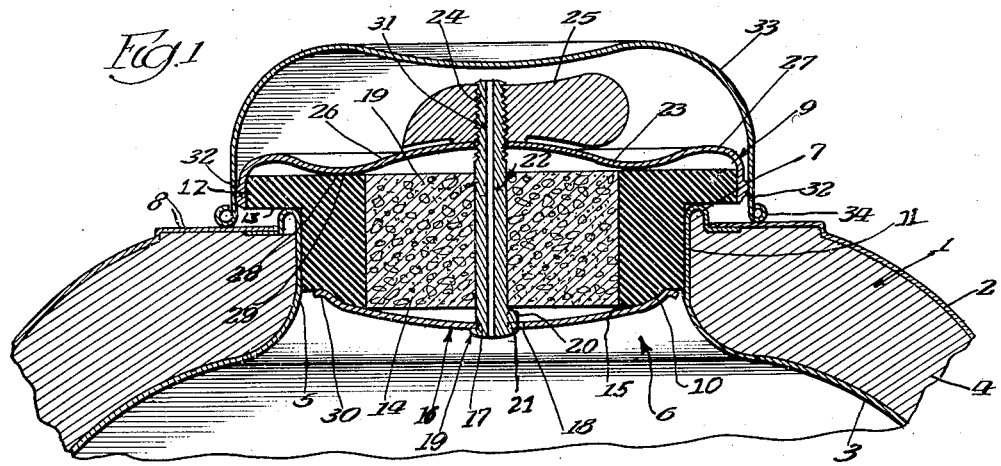
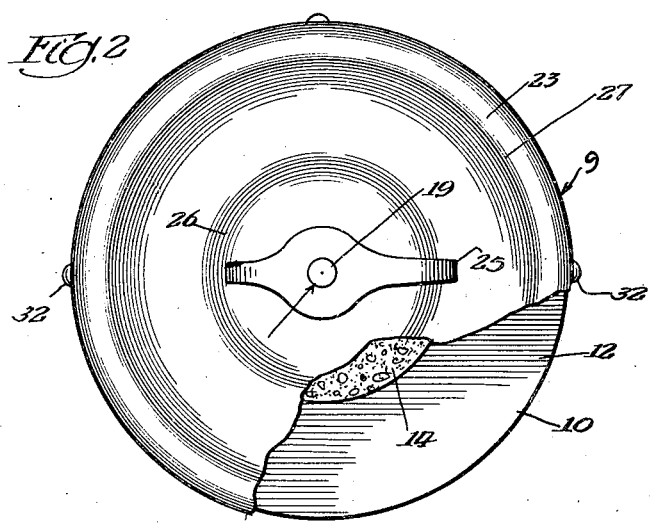
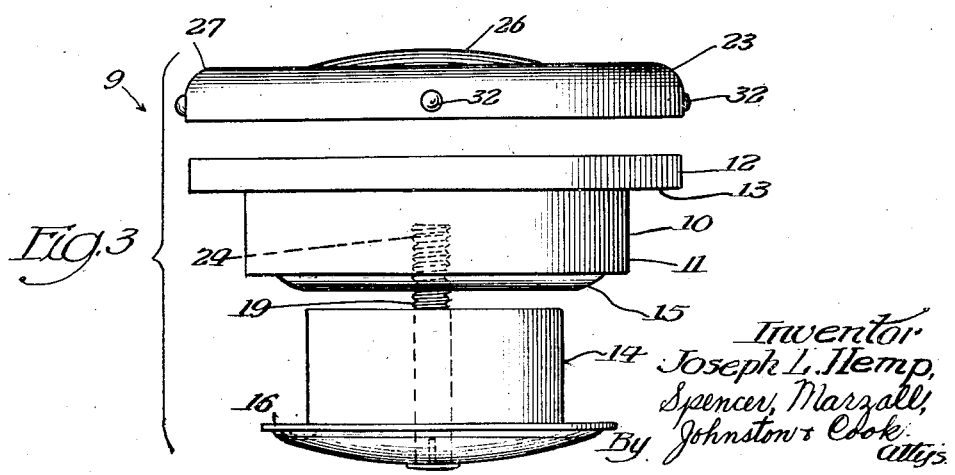
Inventor
Joseph L. Hemp,
By Spencer, Marzall, Johnston & Cook
attys.

Patented July 20, 1948

2,445,325

UNITED STATES PATENT OFFICE 2,445,325

INSULATED CONTAINER CLOSURE

Joseph L. Hemp, Macomb, Ill.

Application March 19, 1945, Serial No. 583,627

5 Claims. (Cl. 215—54)

This invention relates to a closure or stopper for insulated jars and bottles, and other similar and like containers such as vacuum bottles and jars.

An important object of the present invention is to provide an insulated closure member for use on containers, the closure being adapted to be expanded so as to form a tight fit around the neck of the container, there being a hole or a weep hole formed through the closure to permit air to enter the container to release fluid displaced from the container but prevent liquid in the container from spilling out of the opening.

Another important object of the invention is the provision of an insulated closure which is adapted to have its periphery expanded so as to make a tight seal about the neck of the container and which is adapted further to permit air to enter the container so that the liquid in the container will flow freely from a spout or faucet.

A still further object of the invention is the provision of a new and novel insulated closure element which is so constructed and arranged that it may be expanded to fit snugly in the neck of a container, which is provided with a weep hole to permit air to enter into the container as the liquid is poured therefrom, and which is provided with a snap-on cup engaging protuberance peripherally formed on the closure element.

Numerous other objects and advantages will be apparent throughout the progress of the following specification.

The accompanying drawing illustrates a selected embodiment of the invention and the views therein are as follows:

Fig. 1 is a detail sectional view of an insulated container embodying the invention;

Fig. 2 is a detail top plan view of the improved closure, parts being broken away for the sake of clearness; and Fig. 3 is an exploded view showing various parts of the closure in elevation.

The particular closure herein shown for the purpose of illustrating the invention is applied to an insulated container 1 which is provided with an outside metal casing 2, and an inside metal casing or liner 3. Insulation 4 is arranged between the outer casing 2 and the inside liner 3. A container of the above type is disclosed and claimed in applicant's copending application Serial Number 583,628, filed March 19, 1945.

The container 1 terminates in an upwardly extending portion defining a neck 5 which surrounds a central opening 6. The upper end of the neck 5, surrounding the opening 6, terminates in an upstanding annular bead 7 which extends upwardly from the flat part 8 of the container surrounding the neck 5. The part 8 surrounding the neck 5 comprises preferably a flat annular surface extending outwardly from the outer edge of the annular bead or rim part 7. A closure or stopper 9 is adapted to close the opening 6 and has contacting engagement with the interior surface of the neck 5 surrounding the opening 6 and with the annular bead portion 7.

The stopper 9 comprises an annular flexible ring 10 made of rubber or rubber-like material, the stopper 9 being adapted to be compressed, to expand the same, so as to make a tight fit with the inside of the container neck 5. The ring 10 comprises an outer annular surface 11 which is adapted to fit into the opening 6 of the neck of the container and to engage the side walls thereof. An outstanding flange 12 is integrally formed with the part 10 and is adapted to have its under surface 13 engaging the upper edge of the annular bead 7. The member 10 is in the form of a ring having a hollow interior into which a plug 14 made of insulating material, such as cork, is adapted to be received. The outer peripheral wall of the circular cork plug 14 is adapted to have contacting relationship with the inner annular walls of the member 10 surrounding the central opening. The lower end of the ring 10 terminates in a downwardly sloping rim portion 15. The ring 10 also is adapted to have contacting engagement with a dish-shaped circular member 16 which is preferably made of metal coated with vitreous enamel. The member 16 is provided with a circular opening 17 having a notch 18 cooperating therewith.

A longitudinal vertically positioned locking member 19 passes through the opening 17, there being an integral fin 20 formed on the lower end of the member 19 adjacent its head 21 and receivable in the slot or notch 18 so as to prevent turning movement of the member 19. The member 19 passes through a central bore 22 formed in the cork plug 14. The upper end of the member or stem 19 extends through an opening provided in a cover plate 23, which latter is of a cup-shaped formation, the peripheral wall of which encompasses and contacts the periphery of the flange 12, of the ring 10. The upper end of the member 19 is threaded, as indicated at 24, to receive a thumb nut 25. Rotative movement of the thumb nut 25 will draw the upper plate 23, and the lower member 16, toward each other and compress the rubber-like ring 10 to bulge the side walls thereof below the flange 12, and thereby lock securely the closure within the opening in the neck 5 of the container. During this operation, the tendency of the flange to expand will be prevented by the peripheral flange of the cover plate 23, thereby forcing the body of the ring below the flange to expand. The upper part of the top plate 23 may be provided with a central bulge 26 and a peripheral bulge 27, whereby there is provided an internal lower bulge 28 which engages the upper side of the rubber ring 10 between its central opening and its outer peripheral body part, and beyond the plug 14 so that when the thumb nut 25 is tightened, the pressure will be along the points indicated at 29 as the top of the ring and at 30 at the bottom of the ring. The tightening of the thumb nut 25, therefore, squeezes or compresses the ring 10 causing its periphery to bulge outwardly between the inside of the neck 5 and the stopper or closure 9.

The stem 19 is provided with a longitudinal bore or weep hole 31 extending longitudinally so as to permit air to enter into the container to replace liquid poured out of the container from a spout or faucet. This bore or weep hole 31 is small enough in diameter to prevent liquid from spilling out but does allow for the passage of air. Liquid in the container, therefore, may be poured out of the container without removing the container closure or stopper.

The outer peripheral edge of the top plate 23 is provided with spaced protuberances 32 which are adapted to be closed by a cup 33. The cup 33 is preferably made of metal, such as aluminum, and terminates in a peripheral bead 34. The inside periphery of the cup 33 is adapted to engage the protuberances 32 and, inasmuch as these protuberances are very slight in outward dimension, the cup 33 will fit snugly about the entire periphery of the top plate 23 but at the same time will permit easy removal of the cup.

The invention provides a stopper or closure for bottles, jars, and other containers, which is adapted to be expanded by the manual operation of a thumb nut so as to insure tight fitting contact between the closure and the neck of the container. Also, air is free to flow into the container through the weep hole 31 as the liquid is drawn off, thereby permitting free flow of the liquid through a spout or faucet. The provision of the weep opening permits fluid to be drawn off without removing the cover or stopper 9. The closure or stopper is completely insulated and, therefore, no heat will be lost through the stopper, a condition which is extremely desirable and which is ordinarily not inherent in conventional devices. The stopper is composed of a few parts which are readily accessible and are detachable for cleaning and repair purposes.

The bottom member or plate 16, as well as the upper plate 23, is adapted to be made of metal and covered with a vitreous enamel coating, whereby the device may be kept clean. It is desirable, too, that the inside casing or liner 3 be coated with vitreous enamel. The protuberances arranged peripherally about the top plate permit a metal cup to be easily applied in position to secure the cup in place and at the same time provide for its easy removal.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A closure for containers having a neck and comprising a circular rubber ring having a peripheral outer wall and a central opening therethrough, a plug of insulating material in said opening, a circumferential flange on the ring adapted to engage and rest upon said neck, a top plate above said ring, a bottom plate below said ring, a flange on said top plate encompassing the flange on said ring, a stem passing through said plates and plug, and tightening means threadedly engaging said stem whereby to bulge outwardly the portion of the ring below its flange to make a tight fit between the ring and container neck, said flange on the plate maintaining the flange on the ring against bulging.

2. A closure for containers having a neck and comprising a circular rubber ring having a peripheral outer wall and a central opening therethrough, a plug of insulating material in said opening, a circumferential flange on the ring adapted to engage and rest upon said neck, a top plate above said ring and having a downwardly projecting annular bulge engaging the ring, a circumferential flange on said plate encompassing the flange on said ring, a bottom plate engaging the bottom of said ring, a stem passing through said plates and plug, and a tightener threaded on said stem whereby the tightener when tightened will draw the plates together and force the portion of the ring below its flange to bulge outwardly to make a tight seal with the container neck, said flange on the said plate maintaining the flange portion of the ring against bulging.

3. A closure for containers having a neck, said closure embodying a circular rubber ring having a peripheral outer wall and a central opening of substantial area therethrough, a plug of insulating material filling said opening, a top plate above said ring, said plate having a downwardly projecting annular bulge engaging the ring and a peripheral wall encompassing a portion of said plug, a bottom plate engaging the bottom of said ring within and spaced from the plane of said wall, a stem passing through said plates and plug, and a tightener threaded on said stem whereby the tightener when tightened will draw the plates together and force the ring to bulge outwardly to make a tight seal with the container neck, said wall maintaining the portion of the plug encompassed thereby against bulging, said stem having a longitudinal bore therethrough and means thereon engaging said bottom plate to prevent turning thereof.

4. A closure for containers having a neck and comprising a circular rubber ring having a peripheral outer wall and a central opening therethrough, a plug of insulating material in said opening, a top plate above said ring and having a downwardly projecting annular bulge engaging the ring, a peripheral wall on said plate encompassing a portion of said plug, a bottom plate engaging the bottom of said ring, below and within the plane of said wall, a stem passing through said plates and plug, a tightener threaded on said stem whereby the tightener when tightened will draw the plates together and force the portion of the ring below said wall to bulge outwardly to make a tight seal with the container neck, said stem having a longitudinal bore therethrough, protuberances projecting from the peripheral edge of said top plate, and a metal cup over said top plate and engageable with the protuberances.

5. A closure for containers having a neck and comprising a circular rubber ring having a peripheral outer wall and a central opening therethrough, the lower side of said ring being dished, a plug of insulating material in said opening, a top plate above said ring and having a downwardly extending circular bulge adapted to engage the ring intermediate the opening and outer wall, a bottom plate engaging the said lower side of said ring and also dished to permit the lower side of said ring to fit snugly thereagainst, a stem passing through said plates and plug, a tightener threaded on said stem whereby the tightener, when tightened, will draw the plates together and force a portion of the ring to bulge outwardly to make a tight seal with the container neck, and a circumferential flange on said top plate encompassing a portion of the plug, to maintain the last said portion against bulging under pressure of said top and bottom plates.

JOSEPH L. HEMP.

REFERENCES CITED

The following references are of record in the file of this patent:

UNITED STATES PATENTS

| Number | Name | Date |
|---|---|---|
| 315,114 | Brackett | Apr. 7, 1885 |
| 735,402 | North | Aug. 4, 1903 |
| 1,363,804 | Mohn | Dec. 28, 1920 |
| 1,842,261 | Garwood | Jan. 19, 1932 |
| 2,106,122 | McGowan | Jan. 18, 1938 |
| 2,292,149 | Moeller | Aug. 4, 1942 |

FOREIGN PATENTS

| Number | Country | Date |
|---|---|---|
| 125,933 | Switzerland | May 16, 1928 |
| 126,960 | Switzerland | July 16, 1928 |